United States Patent [19]

Enick

[11] Patent Number: 4,921,635

[45] Date of Patent: May 1, 1990

[54] $CO_2$ GELS AND METHODS FOR MAKING

[75] Inventor: Robert M. Enick, Bethel Park, Pa.

[73] Assignee: University of Pittsburgh, Pittsburgh, Pa.

[21] Appl. No.: 275,430

[22] Filed: Nov. 22, 1988

[51] Int. Cl.$^5$ .................... B01J 13/00; E21B 43/22
[52] U.S. Cl. ................ 252/315.1; 252/8.551; 252/8.554
[58] Field of Search ........... 252/315.1, 8.554, 8.551; 570/123, 124, 126, 136; 526/242, 250, 252, 253

[56] References Cited

U.S. PATENT DOCUMENTS 4,607,696  8/1986  Heller et al. .................... 166/275

OTHER PUBLICATIONS

Twieg, R. J. et al., "Observation of a Gel Phase in Binary Mixtures of Semifluorinated Alkanes", *Macromolecules*, vol. 18, (1985), p. 1361.

Rabolt, J. F. et al., "Structural Studies of Semifluorinated n-Alkanes . . . ", *Macromolecules*, vol. 17, (1984), pp. 2786-2794.

*Chem. Abs.*, vol. 109, No. 12, abs. #95638v, Dandge, D. K. et al., in Prepr. Am. Chem. Soc., Div. Pet. Chem., 33(1), 125-8, (1988).

*Primary Examiner*—John F. Terapane
*Assistant Examiner*—John M. Covert
*Attorney, Agent, or Firm*—Reed Smith Shaw & McClay

[57] ABSTRACT

A method for increasing the viscosity of $CO_2$ comprising the steps of: mixing semi-fluorinated alkane and liquid $CO_2$; and venting $CO_2$ vapor from the liquid $CO_2$ until the liquid $CO_2$ becomes supersaturated. A gel that comprises a semi-fluorinated alkane; and liquid $CO_2$. The semi-fluorinated alkane is of the form $(F_3C)-(CF_2)_{N-1}-(CH_2)_{M-1}-(CH_3)$.

12 Claims, No Drawings

$CO_2$ GELS AND METHODS FOR MAKING

FIELD OF THE INVENTION

The present invention pertains to increasing the viscosity of $CO_2$. More specifically, the present invention pertains to the use of semi-fluorinated alkanes to increase the viscosity of $CO_2$.

BACKGROUND OF THE INVENTION

The low viscosity of dense $CO_2$ relative to liquid hydrocarbons at similar conditions prevents it from being effectively used as a displacing fluid in porous media. The $CO_2$ channels through the porous media since it has a high mobility, bypassing much of the hydrocarbon phase rather than displacing it. If the $CO_2$ mobility could be decreased to the same value as the hydrocarbons, the channeling would be inhibited and the recovery of hydrocarbons increased.

The low $CO_2$ viscosity also inhibits its ability to transport small solid particles into formation fractures. These small particles, designed to prop up the fracture caused by the high pressure injection of $CO_2$, must travel as far as possible into the fracture before it collapses in order to increase the permeability of the reservoir. A significant increase in $CO_2$ viscosity would decrease the settling velocity of the particles, allowing the $CO_2$ to transport the particles further into the fracture.

Three methods of reducing the mobility of liquid or supercritical carbon dioxide in porous media include the alternate injection of water, formation of $CO_2$ emulsions or foams and the direct thickening of carbon dioxide. The alternate injection of an aqueous phase reduces the $CO_2$ saturation and therefore the $CO_2$ relative permeability. Emulsions in which the liquid or supercritical $CO_2$, where the interior $CO_2$ phase is separated by aqueous lamallae which contain a small concentration of surfactant, can greatly diminish the $CO_2$ mobility since the size of the pockets of $CO_2$ are of the order of magnitude of the pores. The direct viscosity enhancement of $CO_2$ is a proposed method of $CO_2$ mobility reduction in which the $CO_2$ viscosity is greatly enhanced by the dissolution of small concentrations of a thickening agent directly into the carbon dioxide.

Alternate injection of water and gas, WAG, has been used successfully not only in the $CO_2$ process, but also in other gas displacement processes. Klins, M., *Carbon Dioxide Flooding—Basic Mechanisms and Project Design*, IHRDC, Boston (1984). Stalkup, F., *Miscible Displacement*, SPE Monograph No. 9, SPE, New York (1983). Although the mobility ratio of $CO_2$/water to the fluid being displaced is reduced, it usually remains unfavorable. Furthermore, the injection of water introduces several operational difficulties and increases the time required to inject the entire $CO_2$ slug and, therefore, the duration of the oil recovery project. Slugs of carbon dioxide emulsions, sometimes referred to as foams, have displayed extremely low mobilities in lab tests, but difficulties are encountered in retaining their integrity when they contact crude oil. Stalkup, F., *Miscible Displacement, SPE Monograph No. 9*, SPE, New York (1983). Heller, J. and Taber, J., "Mobility Control for $CO_2$ Floods—A Literature Survey, Topical Report," DOE/MC/10689-3 (Oct. 1980). Heller, J. and Taber, J., "Development of Mobility Control Methods to Improve Oil Recovery by $CO_2$, Final Report," DOE/MC/10689-17 (Nov. 1983). Heller, J., Cheng, L. and Kuntamukkula, M., "Foam-Like Dispersions for Mobility Control in $CO_2$ Floods," -SPE 11233, presented at the 57th Annual Fall Technical Conference and Exhibition of the SPE of AIME, New Orleans, LA (Sept. 26029, 1982). Bernard, G., Holm, L. and Harvey, C., "Use of Surfactant to Reduce $CO_2$ Mobility in Oil Displacement," SPEJ, Aug. 1980, pp. 282-292. Wang, G., "A Laboratory Study of $CO_2$ Foam Properties and Displacement Mechanism," SPE/DOE 12645, presented at the SPE/DOE Fourth Symposium on Enhanced Oil Recovery, Tulsa, OK (Apr. 15-18, 1984). These slugs have been proposed as a means of not only displacing oil, but also plugging highly permeable zones. The direct thickening of $CO_2$ could provide a means of lowering thickening of $CO_2$ mobility and achieving a favorable mobility ratio (less than one) without introducing large amounts of water or encountering the problems associated with the generation or propagation of a foam. Heller, J. and Taber, J., "Development of Mobility Control Methods to Improve Oil Recovery by $CO_2$, Final Report," DOE/MC/10689-17 (Nov. 1983).

Viscosity measurements of carbon dioxide-direct thickener mixtures were reported by Orr, F. M., Jr., J. P. Heller and J. J. Taber, "Carbon Dioxide Flooding for Enhanced Oil Recovery: Promise and Problems,: *J. A. O. C. S.*, Vol. 59, No. 10, (Oct., 1982), p. 810A. Therein it is stated that a polymer which could dissolve at low concentrations and increase the viscosity by a factor of 20 would be needed to make the process economically feasible. However, viscosity enhancements of up to only twenty percent were found in their preliminary experiments. The atactic, straight chain polymers of relatively low molecular weight were soluble in $CO_2$, while the higher molecular weight and isotactic ones were insoluble. The small changes in carbon dioxide's viscosity were due to several factors, the foremost being its inability to dissolve high molecular weight polymers. Plans were also mentioned of continuing the search for more effective compounds among the product lists of manufacturers, and to initiate the synthesis of new polymers may be necessary.

Heller, J. J. and J. J. Taber, "Development of Mobility Control Methods to Improve Oil Recovery by $CO_2$—Final Report," U.S. Dept. of Energy Report DOE/MC/10689-17, Nov. 1983 later reported that no $CO_2$-thickening polymer was found among the current products of any manufacturer. However, they believed that significant progress had been made in the characteristics of polymers which enhance their solubility in $CO_2$, perhaps enabling the synthesis of new polymers for this purpose.

In 1983, Heller, J. P., Dandge, D. K., Card, R. J. and Donarume, L. G., "Direct Thickeners for Mobility of $CO_2$ Floods," SPE 11789, S.O.E. of A.I.M.E., June 1983 further discussed the effect of polymer structure and properties on solubility in $CO_2$. They found that halogens, aldehydes, ring systems with unsaturation in the chain backbone and aromaticity in general were not desirable for a polymer to be soluble in $CO_2$. Similarly, insolubility was found when there was the presence of amide, ester, carbonate and hydroxyl groups in the polymer backbone. Soluble polymers generally had solubility parameters less than eight, but the authors concluded that the compounds' solubilities could not be described with this parameter alone. It was also found that higher molecular weight polymers were much more effective, on a weight concentration basis in increasing the viscosity of carbon dioxide. From this, they concluded that if higher molecular weight polymers could be synthesized which are soluble in carbon dioxide, larger viscosity increases could be achieved with smaller concentrations. The majority of soluble polymers had molecular weights under 6000.

Heller, J. P., Orr, F. M., Jr., and Watts, R. J., "improvement of $CO_2$ Flood Performance," U.S. Dept. of Energy Report DOE/BCO-85/1, Dec. 1984, p. 50 have also investigated the feasibility of using tri-alkyltin fluorides to increase $CO_2$ viscosity. This compound can form associating polymers in propane, butane and hexane which are capable of significantly increasing the fluid viscosity. These non-polar fluids do not interfere with the association between the tin and fluorine of adjacent tri-alkyltin fluoride molecules. $CO_2$, a fluid with no dipole moment, was not able to dissolve tributyltin fluoride, the only commercially available tri-alkyltin fluoride, to a great enough extent to induce any notable increase in the viscosity. Current research by the same investigator is directed at the effects of other types of hydrocarbon groups, rather than butyl, on the solubility of this organometallic compound in carbon dioxide.

Recent work by Terry, R. E., Zaip, A., Angelos, C. and Whitman, D. L., "Polymerization in Supercritical $CO_2$ to Improve $CO_2$/Oil Mobility Ratios," SPE 16270, SPE of AIME, June 1983 has concentrated on synthesizing carbon dioxide soluble polymers in-situ. Using an apparatus that simulates reservoir conditions, the authors found that light olefins can be readily polymerized in such an environment using commonly available initiators. However, no apparent viscosity increases have been measured, since the solubility of the resultant polymer is low.

Dandge, D. K. and Heller, J. P. "Polymers for Mobility Control in $CO_2$ Flods," paper SPE 16271 have also reported success in synthesizing new carbon dioxide soluble polymers from high alpha-olefins, but none have yet been found which satisfactorily enhance the $CO_2$ viscosity.

The present invention involves the use of semi-fluorinated alkanes with $CO_2$ to increase the viscosity of $CO_2$. Semi-fluorinated alkanes have been shown to form gels when dissolved in alkanes such as decane and octane, probably due to resultant formation of a microfibrillar morphology but hereto for have not been known to form gels in $CO_2$. This gel phase in decane and octane results when the mixture is heated above the melting point of the $F(CF_2)_N(CH_2)_MH$ compound, and then cooled. Tweig, R. J., Russell, T. P., Siemens, R. and Rabolt, J. F., Observations of a Gel Phase in Binary Mixtures of Semifluorinated n-Alkanes with Hydrocarbon Liquids," *Macromolecules,* Vol. 18, No. 6 (1985) p. 1361.

SUMMARY OF THE INVENTION

The present invention pertains to a method for increasing the viscosity of $CO_2$. The method, in one embodiment, comprises the steps: of mixing semi-fluorinated alkane and liquid $CO_2$; and venting $CO_2$ vapor from the liquid $CO_2$ until the liquid $CO_2$ becomes supersaturated.

The present invention also pertains to a gel. The gel comprises a semi-fluorinated alkane; and liquid $CO_2$. The semi-fluorinated alkane is $(F_3C)-(CF_2)_{N-1}(CH_2)_{M-1}(CH_3)$.

DESCRIPTION OF THE PREFERRED EMBODIMENT

The viscosity of liquid $CO_2$ can be increased with the use of semi-fluorinated alkanes. These semi-fluorinated alkanes are of the form

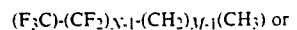

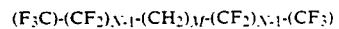

where $14 \geq N \geq 6$ and $1000 \geq M \geq 4$. Preferably, N and M are as large as possible. These semi-fluorinated alkanes can be synthesized by well-known techniques. See J. F. Rabolt, T. P. Russell, and R. J. Tweig; "Structural Studies of Semifluorinated n-Alkanes 1. Synthesis and Characterization of $F(CF2)_N(CH2)_MH$ in the Solid State," Macromolecules 1984., 17, 2786–2794, which is incorporated by reference herein.

Use of semi-fluorinated alkanes with liquid $CO_2$ results in the formation of a gel. This gel has a viscosity greater than liquid $CO_2$. (Note, a gel is defined as a jellylike substance consisting of two components, a continuous fluid such as $CO_2$; and a network of interlocking particles such as semi-fluorinated alkane fibers).

There are several methods for increasing the viscosity of $CO_2$. One method comprises the steps of first mixing semi-fluorinated alkane in liquid $CO_2$ until the liquid $CO_2$ becomes supersaturated. (It is evident that the liquid $CO_2$ is supersaturated when a precipitate first appears in the liquid $CO_2$). Next, the supersaturated liquid $CO_2$ is heated until the precipitate disappears. Then, the heated liquid $CO_2$ with the semi-fluorinated alkane is cooled until a gel is formed.

Another method for increasing the viscosity of $CO_2$ comprises the steps of first mixing semi-fluorinated alkane in liquid $CO_2$. Then, $CO_2$ vapor is vented from the liquid-$CO_2$ until the liquid $CO_2$ becomes supersaturated and forms a gel.

The semi-fluorinated alkane can be introduced directly into the liquid $CO_2$ or first can be dissolved in a light hydrocarbon of the form $C_NH_{2N+2}$ where $5 \leq N \leq 14$. Preferably, the semi-fluorinated alkane is dissolved in pentane. At room temperature, the desired amount of semi-fluorinated alkane is 20 weight % of the pentane/semi-fluorinated alkane mixture. The semi-fluorinated alkane and light hydrocarbon mixture is then combined with the liquid $CO_2$, and the above-described procedures are followed to obtain the gel. Additionally, in general, it is desirable to maintain the liquid $CO_2$ at as low a temperature as possible while combining the semi-fluorinated alkane with it, although the $CO_2$ can be subcritical or supercritical. The lower the temperature, the less semi-fluorinated alkane is necessary for a given amount of $CO_2$ to form the gel. It should also be noted that it is not necessary to use only a single type of semi-fluorinated with the liquid $CO_2$ to form the gel. A mixture of different semi-fluorinated alkanes can also be combined together with the liquid $CO_2$ to form the gel.

EXAMPLES

One example of the formation of the gel involves the use of a 66 cm$^3$ cell which is almost completely filled with liquid $CO_2$ at 24° C. (the remainder of the cell is filled with $CO_2$ vapor). The cell is also charged with 4.6 grams of $(F_3C)-(CF_2)_{11}-(CH_2)_7-(CH_3)$. The cell is next pressurized to 1000 psia. The $CO_2$ vapor present in the cell is then slowly vented from the cell. As the pressure in the cell drops to 900 psia, a clear, low viscosity liquid containing microfibers forms. At 850 psia, a thin gel layer on the surface of a clear liquid containing microfibers forms. When the pressure in the cell is reduced to 775 psia, a clear gel is formed in the cell. When the pressure is reduced to 700 psia, a white gel is formed in the cell. During the entire venting process, the temperature of the cell is maintained at 24° C.

A second example of the formation of the gel also involves a 66 cm$^3$ cell filled mostly of liquid $CO_2$, with the remaining portion filled with $CO_2$ vapor. The cell is charged with 4.6 grams of $(F_3C)-(CF_2)_{11}-(CH_2)_{11}-(CH_3)$. The cell is then pressurized to 1000 psia and maintained at 24° C. At 1000 psia, the cell contains a clear, low viscosity liquid and vapor. When the vapor in the cell is vented resulting in a pressure of 950 psia therein, a clear, low viscosity liquid containing microfibers forms. At a pressure of 900 psia, a thin gel layer on the surface of a clear liquid containing microfibers forms. When the pressure in the cell is reduced to 850 psia, a clear gel forms. When further vapor is vented such that a pressure of 775 psia is present in the cell, a white gel forms.

The liquid $CO_2$/semi-fluorinated alkane gel, having a greater viscosity than liquid $CO_2$, can be used, for example, in the fracture of porous media, or can be used for the tertiary recovery of hydrocarbons in a pourous media.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

WHAT IS CLAIMED IS:

1. A method for increasing the viscosity of $CO_2$ comprising the steps of:
    mixing semi-fluorinated alkane in liquid $CO_2$ until the liquid $CO_2$ becomes supersaturated with semi-fluorinated alkane;
    heating the liquid $CO_2$ that is supersaturated with semi-fluorinated alkane; and
    cooling the liquid $CO_2$ that is supersaturated with semi-fluorinated alkane.

2. A method for increasing the viscosity of $CO_2$ comprising the steps of:
    mixing semi-fluorinated alkane in liquid $CO_2$; and
    venting $CO_2$ vapor from the liquid $CO_2$ until the liquid $CO_2$ becomes supersaturated.

3. A gel comprising:
    semi-fluorinated alkane; and
    liquid $CO_2$.

4. A gel as described in claim 3 including a light hydrocarbon.

5. A gel comprising:
    a mixture of semi-fluorinated alkanes; and liquid $CO_2$.

6. A gel as described in claim 5 including a light hydrocarbon.

7. A gel as described in claim 4 wherein the light hydrocarbon is pentane.

8. A gel as described in claim 6 wherein the light hydrocarbon is pentane.

9. A gel as described in claim 3 wherein the semi-fluorinated alkane has the formula $(F_3C)-(CF_2)_{N-1}-(CH_2)_{M-1}-(CH_3)$ or $(F_3C)-(CF_2)_{N-1}-(CH_2)_{2M}-(CF_2)_{N-1}-(CF_3)$ where $14 \geq N \geq 6$ and $1000 \geq M \geq 4$.

10. A gel as described in claim 5 wherein the semi-fluorinated alkane has the formula $(F_3C)-(CF_2)_{N-1}-(CH_2)_{M-1}-(CH_3)$ or $(F_3C)-(CF_2)_{N-1}-(CH_2)_{M}-(CF_2)_{N-1}-(CF_3)$ where $14 \geq N \geq 6$ and $1000 \geq M \geq 4$.

11. A method as described in claim 1 wherein the semi-fluorinated alkane has the formula $(F_3C)-(CF_2)_{N-1}-(CH_2)_{M-1}-(CH_3)$ or $(F_3C)-(CF_2)_{N-1}-(CH_2)_{M}-(CF_2)_{N-1}-(CF_3)$ where $14 \geq N \geq 6$ and $1000 \geq M \geq 4$.

12. A method as described in claim 2 wherein the semi-fluorinated alkane has the formula $(F_3C)-(CF_2)_{N-1}-(CH_2)_{M-1}-(CH_3)$ or $(F_3C)-(CF_2)_{N-1}-(CH_2)_{M}-(CF_2)_{N-1}-(CF_3)$ where $14 \geq N \geq 6$ and $1000 \geq M \geq 4$.

* * * * *

UNITED STATES PATENT AND TRADEMARK OFFICE
CERTIFICATE OF CORRECTION

PATENT NO. : 4,921,635
DATED : May 1, 1990
INVENTOR(S) : Robert M. Enick

It is certified that error appears in the above—identified patent and that said Letters Patent is hereby corrected as shown below:

In the Abstract, line 7, the chemical phrase "$(F_3C)-(CF_2)_{N-1}-(CH_2)_{M-1}-(CH_3)$" should be -- $(F_3C)-(CF_2)_{N-1}-(CH_2)_{M-1}-(CH_3)$ --.

In Claim 9, column 6, lines 25-26, the chemical formula "$(F_3C)-(CF_2)_{N-1}-(CH_2)_{2M}-(CF_2)_{N-1}-(CF_3)$" should be replaced by the formula -- $(F_3C)-(CF_2)_{N-1}-(CH_2)_M-(CF_2)_{N-1}-(CF_3)$ -- .

Signed and Sealed this

Seventeenth Day of March, 1992

Attest:

HARRY F. MANBECK, JR.

*Attesting Officer*  *Commissioner of Patents and Trademarks*